Aug. 27, 1935.  D. C. PEDERSEN  2,012,434

CULTIVATOR ATTACHMENT FOR TRACTORS

Filed July 6, 1933  2 Sheets-Sheet 1

INVENTOR:
DINES CHRISTIAN PEDERSEN
BY: Francis E. Boyce

ATTORNEY

Patented Aug. 27, 1935

2,012,434

UNITED STATES PATENT OFFICE 2,012,434

CULTIVATOR ATTACHMENT FOR TRACTORS

Dines Christian Pedersen, Holbak, Denmark

Application July 6, 1933, Serial No. 679,178
In Denmark July 16, 1932

3 Claims. (Cl. 97—40)

This invention relates to a cultivator attachment for tractors, the principal object of the invention being to provide a cultivating device which is readily attachable to and detachable from an ordinary tractor, whereby the tractor will be available for other uses when not employed as a cultivator.

A further object of the invention is to provide a cultivator attachment in which the tilling elements are partially balanced and are so suspended that their working depth cannot be accidentally increased.

Further objects and advantages of the invention will appear as the description proceeds.

One construction of the invention is shown by way of example on the drawings.

Figure 1:
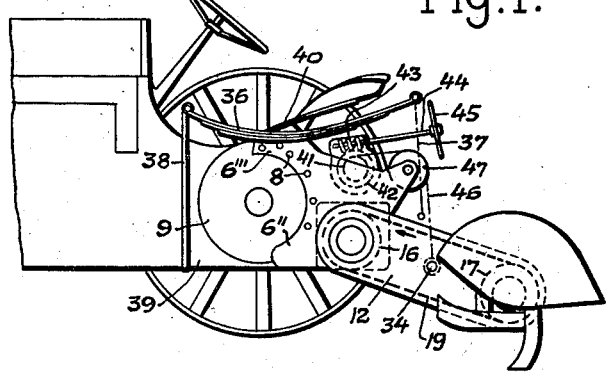
Fig. 1 shows the rear part of a well-known form of tractor with the tilling attachment in position (the left rear wheel of the tractor is omitted in order better to show the application of the device).
Figure 3:
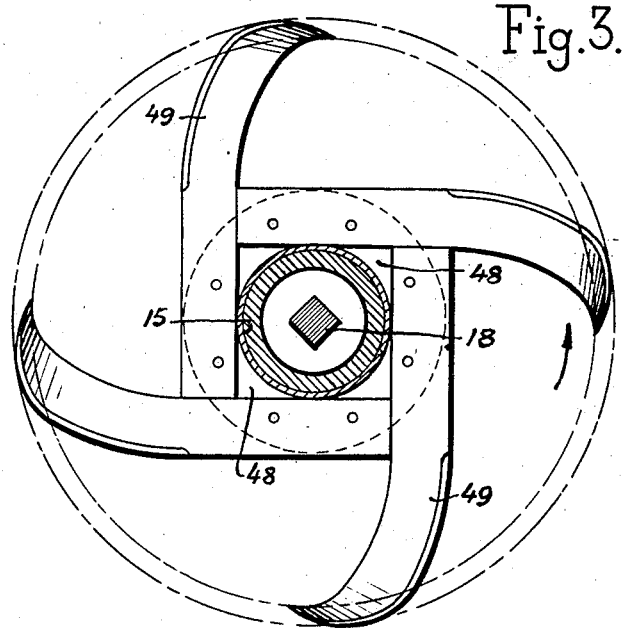
Figure 2:
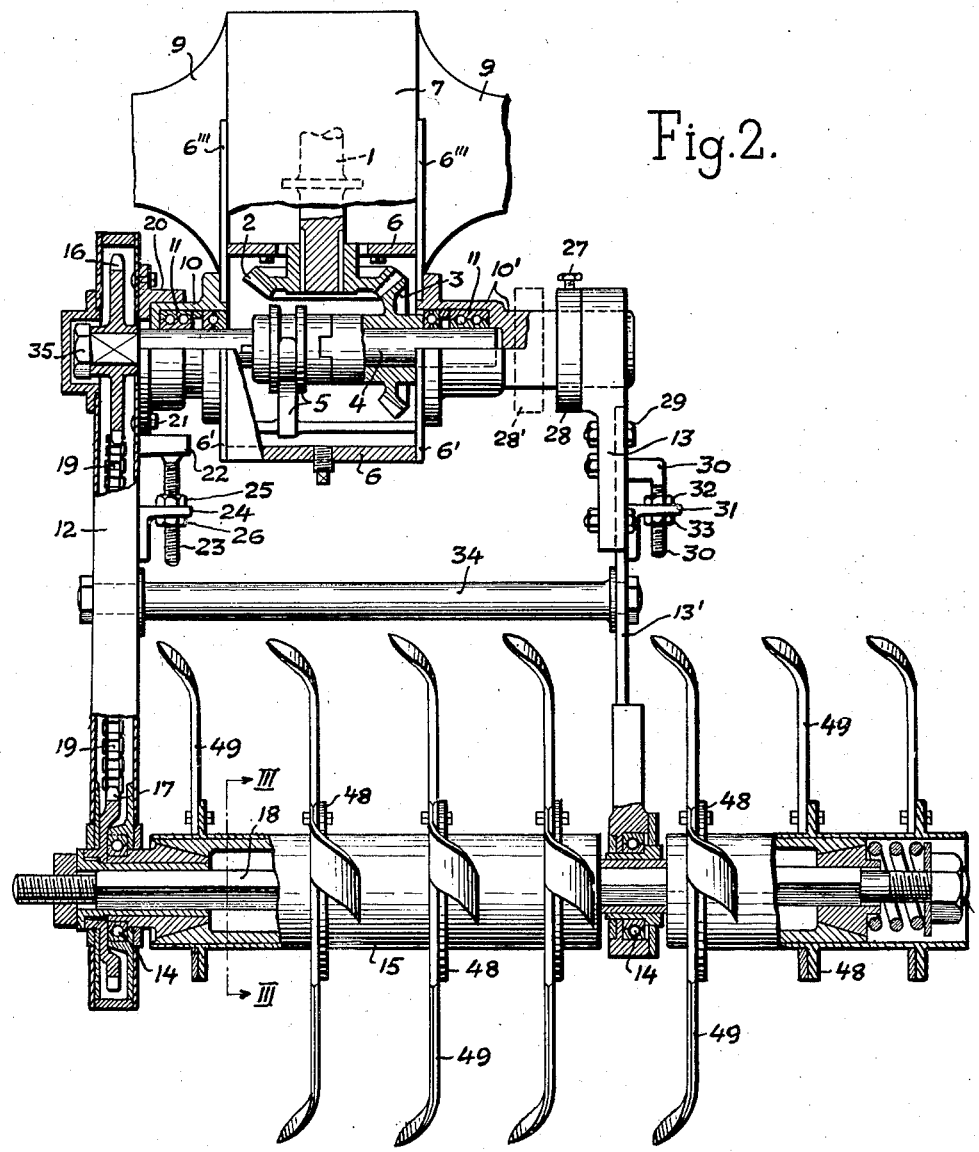
Fig. 2 shows the tiller device partly in section.

Fig. 3 a cross-section of the tiller drum.

1 is the worm shaft of the tractor, and when the tiller device is to be attached to the tractor the said shaft is fitted with a fixed bevel gear wheel 2 adapted to engage a corresponding bevel gear wheel 3, which is free to revolve about the main shaft 4 of the device and can be coupled thereto by means of a suitable clutch coupling 5. The main shaft 4 with the said coupling device is enclosed in an oil-tight casing 6, 6', the side walls 6' of which project forward and upward beyond the casing itself, forming each a flange 6'' extending upward in the shape of an arm 6''' curving forward, the said flange and arm being intended to be bolted to the differential housing 7 of the tractor along the edge of the latter and being for that purpose fitted with a curved row of bolt holes 8 situated so as to be in alinement with the bolt holes in the rear-axle casings 9, in such a manner that the latter and the coupling casing can be clamped to the differential housing 7 by one and the same set of bolts.

The side walls 6' of the coupling casing are fitted on the outside with bearing housings 10, 10' for ball bearings 11 for the main shaft 4. These bearing housings are cylindrical on the outside and form pivot pins for the supporting arms 12 and 13 of the tiller drum, which arms are thus prevented from actuating the main shaft 4 to the least extent.

The supporting arms 12 and 13, 13' are each fitted at the rear with a ball-bearing 14 for the tiller drum 15.

One supporting arm 12 is hollow and encloses the transmission members for transmission of the rotary motion from the main shaft 4 to the tiller drum 15, viz. in the construction shown a sprocket wheel 16 on the main shaft 4 and a corresponding sprocket wheel 17 on the shaft 18 of the tiller drum, and a chain 19 passing over these sprocket wheels. The hollow supporting arm 12 is journalled on the bearing case 10 by means of a bearing brass 20 provided on the inner face (i. e. the side facing the central plane of the device) of the bearing housing and, in order to enable the tightness of the chain to be regulated, clamped to the supporting arm by means of bolts 21 passing through oblong holes in the inner wall thereof and fitted on a projecting part 22 with a threaded pin 23 facing towards the rear in the longitudinal direction of the supporting arm, the said pin passing through a hole in a bracket 24 on the supporting arm and being fitted in front of and behind the same with a nut 25 and 26, respectively. The other supporting arm 13, 13' consists of two parts 13 and 13', the part 13 being journalled on the bearing housing 10' outside of a collar 28 adapted to be clamped thereto by means of a set screw 27, while the parts 13 and 13' for the purpose of enabling the tiller drum to be adjusted parallel to the main shaft after each adjustment of the chain are interconnected partly by bolts 29 passing through round holes in one of the parts and oblong holes in the other part, and partly by a threaded angle pin 30 provided on one of the parts and passing through a hole in a bracket 31 on the other part, and fitted on either side of the said bracket with a nut 32 and 33, respectively.

The supporting arm 12 and the rear part 13' of the supporting arm 13, 13' are interconnected by a heavy strut 34.

The supporting arm 12 is maintained in position on the main shaft 4 by means of a nut 35 at the end of the said shaft outside of the sprocket wheel 16. When this nut is removed, and the collar 28 is loosened and moved into the position 28' shown by dotted lines, and the parts 13 and 13' are separated, and the part 13 then moved close to the collar and swung downward, the supporting arms 12 and 13 with the tiller drum 15 will be able to be moved so far sideways that the supporting arm 12 with the sprocket wheel 16 will go entirely free of the main shaft 4, and when also the suspension chains mentioned in the following have been unhooked, the arms and drum can then be removed entirely from the tractor, which will thus be available for other uses.

To the top of the forward curved arms 6''' of the side walls 6' of the coupling casing a powerful spring (wagon spring) 36 is attached, and to the rear end of this spring the supporting arms 12 and 13, 13' are detachably suspended by means of a forked chain 37, while the front end of the spring is connected to a stirrup or the like 38, which is passed around the gear casing 39 of the tractor when the tilling device is to be attached. The strength of the spring is adjusted in such a manner that the spring will be nearly but not quite strong enough to lift the supporting arms with the tiller drum journalled therein.

It will be understood, of course, that the invention is not limited to the provision of a single spring 36.

On top of the coupling casing, between the projecting side walls 6' thereof, and pivotally supported by the said walls a drum 41 is provided, which is firmly connected to a worm wheel 42 engaging a worm 43 at the end of a shaft 44 adapted to be rotated by means of a handle or wheel 45. To a point of the curved surface of the drum one end of a chain 46 is attached, which passes over a guide disc 47 and the other end of which is connected releasably to the strut 34.

It will be seen that by a rotation of the handle or wheel 45 the chain can be wound on to the drum, and the tiller drum thereby be lifted more or less and, maybe, come entirely free of the soil. The power required for this is quite small, as the weight of the said parts is partly supported by the spring 36. The length of the free chain between the drum and the strut determines the depth of soil to be treated.

In the construction shown the tiller drum is so long that the same, besides filling the space between the two supporting arms, extends somewhat beyond one of the arms, so that the soil can be worked also behind one of the rear wheels of the tractor.

If desired the tiller drum can be made so long that it will project beyond both of the supporting arms, and will treat the soil throughout the entire width of the tractor, from the extreme edge of one rear wheel to the extreme edge of the other one.

The parts of the tiller drum that are situated outside of the supporting arms may be detachable, so that the same can be attached or detached, as desired. The two parts of the drum shaft are then assembled by simply being screwed together.

The tiller drum itself is of the kind known per se with drum-shell units coupled frictionally to the drum shaft 18 and fitted with ring flanges 48 to which the tiller tines are bolted. In the construction shown the tines themselves 49 consist of knives of flat steel radially disposed relatively to the drum and curved somewhat towards the rear (counted in the direction of the motion) and, as far as the outer part is concerned, also bent sideways in such a manner that their sharpened front edge will be situated somewhat farther away from the drum axis than their rear edge.

Having thus described my invention, what I claim is:—

1. The combination with a tractor having a worm shaft and a differential housing, of a cultivator attachment, comprising a casing secured to the differential housing of the tractor, a main shaft mounted for rotation in bearings carried by said casing, means for transmitting rotary motion directly from the worm shaft of the tractor to said main shaft, a pair of arms mounted to swing about said main shaft, a tiller drum journalled at the rear ends of said arms and carrying tilling members, and means for transmitting rotary motion from the main shaft to said tiller drum, said pivoted arms being rigidly interconnected and maintained in position on their pivot pins by means of a collar with set screw disposed at the inside of one of said arms, the said collar after having been loosened being able to slide along the pivot pin concerned, allowing thereby also a displacement of the two interconnected arms so far that the other arm comes entirely free of the main shaft, the first mentioned arm consisting of two parts bolted together, the rear one of which is the one that is connected to the other arm, in such a manner that the two arms with the tiller drum journalled therein, although with exception of the front part of the divided arm, can be detached entirely, whereby the tractor will be available for other uses.

2. The combination with a tractor having a worm shaft and a differential housing, of a cultivator attachment, comprising a casing secured to the differential housing of the tractor, a main shaft mounted for rotation in bearings carried by said casing, means for transmitting rotary motion directly from the worm shaft of the tractor to said main shaft, a pair of arms mounted to swing about said main shaft, a tiller drum journalled at the rear ends of said arms and carrying tilling members, and means for transmitting rotary motion from the main shaft to said tiller drum, the sidewalls of said casing being extended forward and upward, and each forming a flange and a forwardly curved arm adapted to be secured to the differential housing by the same means by which the rear axle casings of the tractor are secured.

3. The combination with a tractor having a worm shaft and a differential housing, of a cultivator attachment, comprising a casing secured to the differential housing of the tractor, a main shaft mounted for rotation in bearings carried by said casing, a pair of intermeshing gears one on the worm shaft of the tractor and the other on said main shaft for transmitting motion to the main shaft, a pair of arms mounted to swing about said main shaft, a tiller drum journalled at the rear ends of said arms and carrying tilling members, means for transmitting rotary motion from the main shaft to said tiller drum, a spring mounted on said casing, means for suspending said arms and the tiller drum carried thereby from said spring, the tension of said spring being slightly insufficient to raise said arms, a rotatable drum mounted in said casing, a chain carried by said drum and connected with said arms, and means for rotating the drum thereby to swing said arms on their pivot.

DINES CHRISTIAN PEDERSEN.